United States Patent [19]

Jensen

[11] Patent Number: 4,793,722
[45] Date of Patent: Dec. 27, 1988

[54] FLEXIBLE DAMPED BEARING ASSEMBLY

[75] Inventor: Richard C. Jensen, Greensburg, Pa.

[73] Assignee: Elliott Turbomachinery Co., Inc., Jeannette, Pa.

[21] Appl. No.: 640,893

[22] Filed: Aug. 14, 1984

[51] Int. Cl.$^4$ .............................................. F16C 27/06
[52] U.S. Cl. ..................................... 384/99; 384/222
[58] Field of Search ................. 384/99, 125, 222, 220, 384/309, 398

[56] References Cited

U.S. PATENT DOCUMENTS

| | | | |
|---|---|---|---|
| 2,655,113 | 10/1953 | Ward .................................. | 308/4 A |
| 3,125,382 | 3/1964 | Herndon et al. .................... | 308/4 A |
| 3,164,216 | 1/1965 | Hall et al. .......................... | 308/4 A |
| 3,357,757 | 12/1967 | Morley et al. . | |
| 3,394,971 | 7/1968 | Bazeley . | |
| 3,756,672 | 9/1973 | Hibner et al. . | |
| 3,901,557 | 8/1975 | Daniels . | |
| 3,979,155 | 9/1976 | Sood et al. . | |
| 4,027,931 | 6/1977 | Streifert . | |
| 4,042,023 | 8/1977 | Fox .................................... | 308/4 A |
| 4,214,796 | 7/1980 | Monzel et al. . | |
| 4,337,983 | 7/1982 | Hibner . | |

OTHER PUBLICATIONS

Journal for . . . Power, Feder et al, "Investigation of . . . Orbits", Jan. 1978, pp. 15–21.
Journal of Lubrication . . . , Gunter et al, "Design of . . . Dampers . . . ", Jan. 1977, pp. 57–64.
Journal of Engineering . . . , Simandiri et al, "Effect on Pressurization . . . ", Feb. 1976, pp. 109–117.
Journal of Engineering . . . , Cunningham et al, "Design of a . . . Damper . . . ", Nov. 1975, pp. 1883–1889.
Choy et al, "Application of . . . Dampers", ASLE Transactions, vol. 25, pp. 245–251.
Journal of Mech. Des., Bansai et al, "Experimental . . . Whirl Orbits", vol. 100, Jul. 1978, pp. 549–557.
Journal . . . for Industry, Mohan et al; "Design . . . for Rigid Motors", Aug. 1974, pp. 976–982.
Journal . . . for Power, Rabinowitz et al, "Stability of . . . . . Flexible Motors", Oct. 1977, pp. 545–551.
Theory of Hydrodynamic Lubrication, McGraw-Hill, Pincus et al, Chapter 7 (no date).

Primary Examiner—Lenard A. Footland
Attorney, Agent, or Firm—Webb, Burden, Ziesenheim & Webb

[57] ABSTRACT

A flexible damped bearing assembly for securing a rotating shaft maintained within a bearing is disclosed. An annular damper formed from a resilient material includes an axial bore for receiving the bearing and shaft. The damper is additionally slotted to define damper arms extending outwardly therefrom. Damper pads are used in conjunction with the damper arms to define pivot points about which the damper arms are displaced on the application of force to the damper. A damping fluid is provided between the slots and the exterior surface of the damper and a retainer structure such that numerous damping locations are provided. The damper arms are further defined to provide a spring force which may be tuned as required. This combination provides a compact bearing assembly capable of supporting a shaft while damping vibratory oscillations.

15 Claims, 2 Drawing Sheets

FLEXIBLE DAMPED BEARING ASSEMBLY

BACKGROUND OF THE INVENTION

This invention relates to a flexible bearing assembly for securing a rotating shaft maintained within a bearing. More particularly the present invention concerns a combination spring and damper formed by cutting slots in a solid resilient member to form damper arms which both assist in providing a spring force for centering the shaft and providing improved amplified squeeze film-type damping.

In a turbomachine it is desirable to support a shaft for high speed rotation. It is necessary to provide a bearing about the shaft to minimize rolling resistance of the shaft while securing the shaft in the appropriate position. The support structure for securing the shaft should be a stiff as possible. The bearing retainer supporting the bearing must be sufficiently resilient that abnormal displacement in any specific direction is resisted and must include means to act as a damper. A typical bearing assembly provides means for centering the assembly to maintain the shaft in the desired position. A spring means for tuning damping of the shaft to the desired frequency also may act to limit displacement during unsual operating conditions.

Additionally if the shaft is to be operated above the first critical speed or any higher critical speed it is necessary to provide damping. Without damping the vibratory force at critical speed will theoretically become infinite. Hence it is necessary to provide damping to maintain the structural integrity of the turbomachine support as it passes through critical speeds.

Previous flexible damped bearing supports such as may be seen in U.S. Pat. Nos. 4,027,931 and 3,979,155 disclose a bearing for securing the rotor and damping means mounted together with the bearing providing the necessary damping. Located to the side of the damper is a cage-type spring extending about the shaft. The cage spring and the damper are mounted axially relative to the shaft and take up considerable shaft space. Additionally they are separate members which must be joined in a structural arrangement as shown in these patents. Similar cage-type structural supports have been utilized in turbine engines such as aircraft engines.

One effort at providing an integral damper and spring for maintaining the shaft in position is shown in U.S. Pat. No. 3,394,971. Therein a spring is spaced circumferentially about the bearing race and a support structure and is attached to each such that some flexure is provided between the two. The spring is a separate structure mounted to the exterior of the bearing race and the support by rivets or similar means at spaced locations. This particular bearing provided no integral damping therewith.

The present invention provides a single structure capable of providing both damping and a spring to tune the damping within a single annular element. Additionally no cage spring nor other axially extending device is necessary and the length of the shaft being utilized may be accordingly reduced. The device is capable of being tuned to obtain the desired damping and spring force characteristics by the design of the damper arms and pivot points within the damper body of the device.

SUMMARY OF THE INVENTION

It is an object of the present invention to provide a flexible damped bearing assembly for use in supporting a shaft and bearing of a turbomachine.

It is another object of the present invention to provide a single integral device capable of providing both damping and a spring force while maintaining a shaft in position.

It is a further object of the present invention to provide a damper capable of being tuned to damp the desired resonant frequency.

It is a yet further object of the present invention to provide a combination damper and spring which utilizes a minimum of shaft length thereby reducing overall turbomachine costs.

It is a still further object of the present invention to provide a squeeze film damper as a portion of a bearing assembly capable of amplifying the damping effect created using a squeeze film.

It is yet another object of the present invention to provide a squeeze film-type damper utilizing the same damping fluid as is utilized to lubricate the bearing of the shaft.

It is another object of the present invention to provide a safe, economical, reliable, and easy to assemble and manufacture combination damper and spring for use with a turbomachine.

Other objects will be apparent from the description to follow and the appended claims.

These and other objects of the present invention are achieved according to a preferred embodiment of the invention by the provision of a flexible damped bearing assembly for securing a rotating shaft maintained within a bearing. The assembly includes an annular damper means formed from a resilient material having an axial bore sized to receive the bearing and shaft, said damper means including at least one damper arm defined between a surface of the damper and a transversely extending damper slot. A retainer for securing the damper and means for supplying a damping fluid to the damper are further disclosed. Additionally disclosed is a pivot means for localizing forces applied through the damper to the retainer, said pivot means being located relative to the damper arm to cause complex damper arm displacement for effecting damping upon displacement of the damper means.

Alternatively a combination damper and spring in which a rotating shaft and bearing may be mounted which acts to damp vibration in said shaft and bearing is disclosed. The combination includes an annular damper body defining an interior bore having a generally cylindrical interior surface sized to receive the shaft and bearing and a generally cylindrical exterior surface, at least one damper arm formed from a portion of the damper body, said arm being defined by a slot extending from a cylindrical surface of the damper body into the interior of the damper body and a cylindrical surface of the damper body whereby said arm may be displaced distinctly from the remainder of the damper body, said slot being sized to receive a damping fluid such that upon the application of a force to the combination damper and spring the combination is physically displaced and exerts a spring force against said displacement and the damper arm is displaced relative to the damper body, said displacement effecting displacement of fluid located within the slot to effect damping by creating a viscous force in opposition to the forces created by displacement.

DESCRIPTION OF THE PREFERRED EMBODIMENT

The invention herein will be described with reference to a damper including three damper arms, coacting slots and damper pads. The selection of the number and specific geometry of the various components is dependent upon the particular application and the desired effect such as tuning the system to be most effective at resonant conditions. In addition the utilization herein of a shaft and bearing as a combination is intended to reflect that any type of bearing such as a sleeve, roller, ball or other type of bearing, may be utilized and mounted on a shaft. This bearing must be capable of transmitting displacement of the shaft to the damper such that the damper may both act to center the bearing and shaft combination as well as damping the oscillatory forces.

Figure 1:
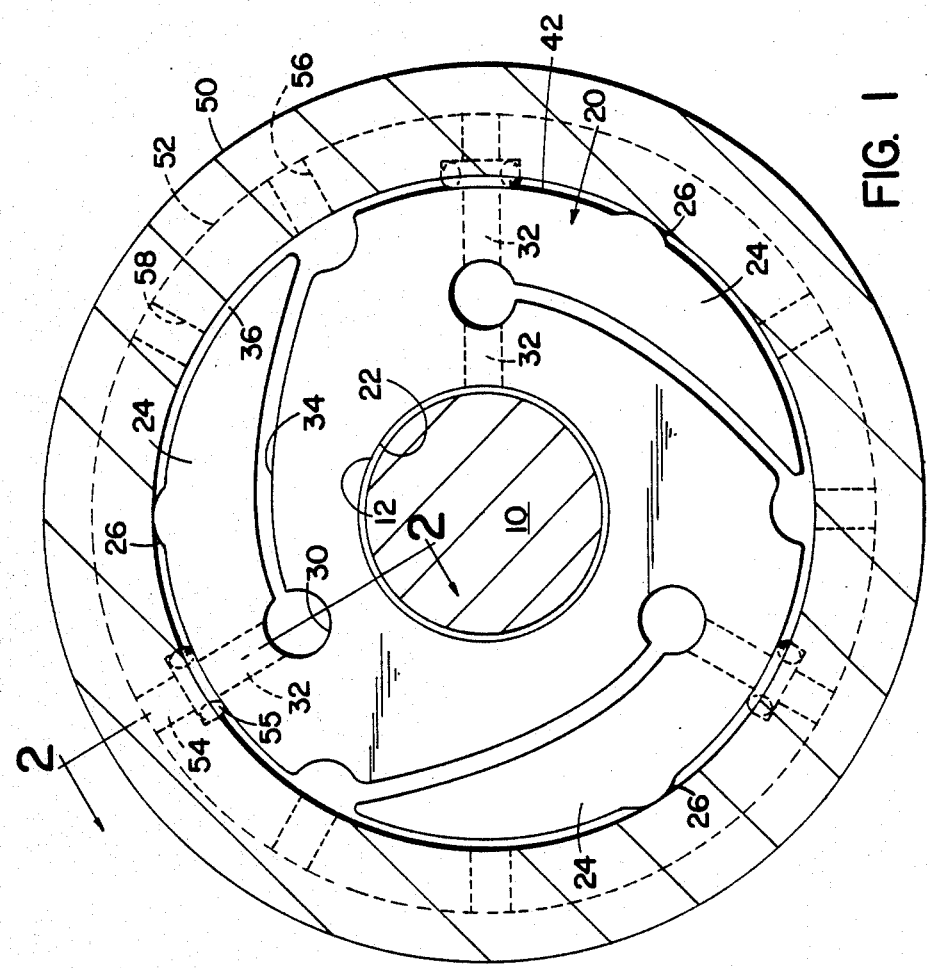
FIG. 1 is a front view of a damper and a retainer.

Referring first to FIG. 1 it may be seen that the shaft and bearing collectively designated as 10 have an exterior surface 12. Damper 20 is annular in configuration having a width (the dimension extending into the paper) of whatever is necessary to support the shaft and bearing and to provide the desired spring and damping forces. Damper 20 has a damper body from which are formed damper arms 24. As may be seen in FIG. 1 there are provided three damper arms 24. Each damper arm is defined between a transversely extending damper slot 34 extending from the exterior surface of the damper to an interior portion of the damper and the exterior surface. Each damper arm has an exterior end located adjacent the exterior surface and an interior end located adjacent the interior portion of the damper arm. The damper slot extends the entire width of the damper and is filled with damping fluid. Feed conduit 32 extends from the exterior diameter of the damper inwardly to channel 30 which is connected to damper slot 34 and extends the width of the damper. In this manner damping fluid, which is also lubricating fluid, may be supplied through the feed conduit to the channel and distributed from the channel across the entire width of the damper and through damper slot 34. At least one of the feed conduits 32 is shown extending additionally from channel 30 to the interior surface 22 of the damper such that lubricating fluid may be supplied to the bearing.

Retainer 50 is shown positioned circumferentially about the damper and includes a lubricant supply groove 52 through which lubricant may be supplied to the damper. Connected to lubricant supply groove 52 is shown feed conduit 54 secured by O-ring seal 55 such that lubricant may be supplied under pressure from the lubricant supply groove to the feed conduit of the damper and from there to the channel and the damper slot. Additionally via feed conduit 58, lubricant is supplied from lubricant supply groove 52 to the damper gap 36 formed between the exterior surface of the damper and the interior surface of the retainer. Damper pads 26 are shown extending outwardly from the exterior surface of the damper to engage the interior surface of the retainer, one damper pad extending for each damper arm. It is through this damper pad that all forces are transmitted from the damper to the retainer.

Discharge conduits 56 are shown located adjacent the exterior end of the damper slot 34 such that lubricant may be removed from the damper slot at this location. Although not seen in this drawing, lubricant is directed to a lubricant discharge groove 59 as may be seen in FIG. 2. In this manner it may be seen that lubricant is directed inwardly from the supply groove 52 through feed conduit 54 to feed conduit 32 through channel 30, through damper slot 34 and then outwardly through discharge conduit 56 to lubricant discharge 59. Additionally lubricant is supplied through feed conduit 58 into damper gap 36 and from there to discharge conduit 56. In this manner a constant supply of lubricant (damping fluid) is supplied to the various slots and gaps in the device.

Figure 2:
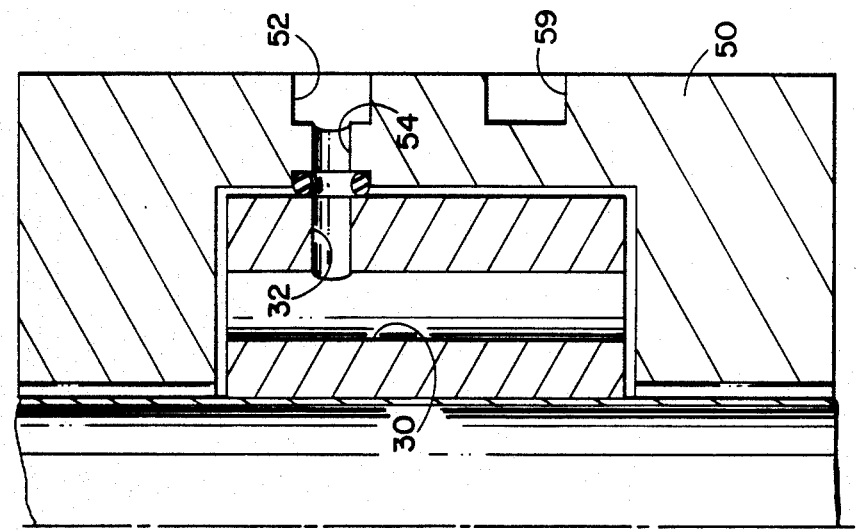
FIG. 2 is a partial sectional view of FIG. 1 taken at line II—II.

Referring to FIG. 2 there may be seen a sectional view of FIG. 1 taken at line II—II. Retainer 50 is shown being generally rectangular in cross section and defining an opening for receiving the damper. Lubricant supply groove 52 is shown connected to feed conduit 54 which is placed in registration with feed conduit 32 of the damper for supplying lubricant thereto. O-ring seal 55 is provided for sealing this particular connection. Lubricant discharge groove 59 is shown although the specific conduit for supplying lubricant thereto is not visible in this Figure. Additionally as may be seen in FIG. 2, lubricant is supplied through feed conduit 32 of the damper into channel 30 extending the entire width of the damper. It is from this channel 30 that lubricant is supplied to damper slot 34.

Figure 3:
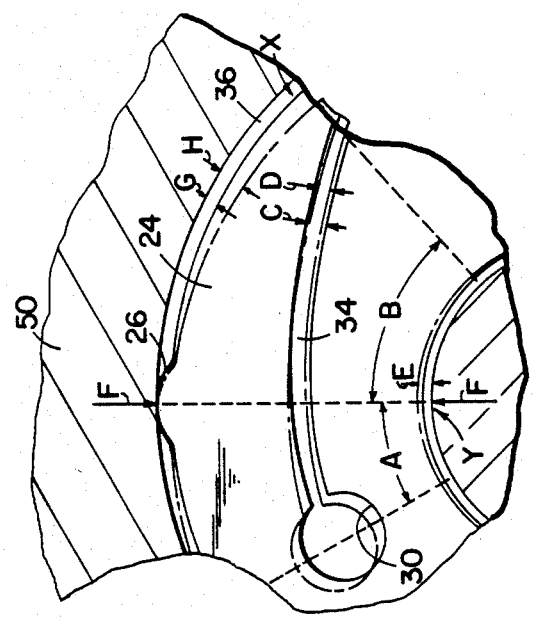
FIG. 3 is a partial front view showing applied forces and the position of the damper in the at-rest and stressed positions.

Referring now to FIG. 3, there may be seen a combination force diagram and displacement diagram indicating the manner of operation of the present damper. In FIG. 3 it may be seen that channel 30 is circular in cross section and is connected to damper slot 34 which has a slight curvature thereto. Damper slot 34 could be equally straight in configuration. Damper gap 36 and damper pad 26 are additionally shown as is retainer 50.

In FIG. 3 the solid lines show the position of the damper and damper arm prior to application of any force from the shaft and bearing thereto. The dotted lines show the position of the various components after the application of a compressive force. Additionally it may be seen that damper pad 26 is located an angular distance A from the center of channel 30 to a radial line passing through the center of damper pad 26. Additionally damper pad 26 is located at an angular distance B between the radial line passing through damper pad 26 and the radial line passing through the end of the damper arm. As may be seen the angular distance B is much greater than the angular distance A.

When the shaft and the bearing apply a force F to the interior surface of the damper at point Y the damper is displaced a distance labeled E to the dotted line position shown. To counterbalance force F, an equal force F is applied at the damper pad by retainer 50. Since the damper pads are the only points of contact between the damper and the retainer, all forces are localized to these points.

Damper pad 26 further serves as a pivot point for the damper arm as a force is applied. As may be seen channel 30 and the interior end portion of the damper slot are displaced inwardly when the force is applied. Additionally the gap between the damper arm and the retainer is reduced in the angular arc portion labeled A. However, since damper pad 26 serves as a pivot point, as a portion is displaced outwardly, most of the damper arm is displaced inwardly. Hence it may be seen by dotted lines that damper arm 24 moves toward the center of the damper as the remainder of the damper body is displaced outwardly. It may be seen that the distance labeled C is the width of the damper slot prior to the force being applied. At that particular location the width is reduced to distance D when the force is applied. At the end of the damper arm at point X amplification of damping may be obtained by positioning the components appropriately such that the end of the damper arm moves at least twice the distance E that the damper moves when the force is applied.

Additionally the gap between the damper arm and the retainer labeled G at the at-rest or no force position increases to a distance H when the force is applied. Hence it may be seen that there are numerous moving surfaces displacing damping fluid as the force is applied. Since some of these faces are displaced further than the actual displacement of the damper an amplification effect is achieved providing for additional damping. Additionally the arm serves as a spring acting to exert a force to center the bearing and shaft and to tune the damping. Not only does the material of the damper itself act as a spring since it is resilient but the combination of a damper arm defined by a damper slot acting relative to a pivot point creates an additional spring force pivoted about the channel. In this manner a damper capable of providing both amplified damping and a spring force which is reduced in size and light in weight is capable of supporting a shaft operating above the various critical speeds.

The invention has been described herein with reference to a particular embodiment. It may be understood by those skilled in the art that variations and modifications can be effected within the spirit and scope of the invention.

I claim:

1. A flexible damped bearing assembly for securing a rotating shaft maintained within a bearing which comprises:
   an annular damper means formed from a resilient material having an axial bore sized to receive the bearing and shaft, said damper means including at least one damper arm defined between a surface of the damper means and a transversely extending damper slot;
   a retainer for securing the damper means;
   means for supplying a damping fluid to the damper means; and
   pivot means for localizing forces applied through the damper means to the retainer, said pivot means being located relative to the damper arm to cause complex damper arm displacement for effecting damping upon displacement of the damper means.

2. The apparatus as set forth in claim wherein the damper means further defines a damper channel extending the width of the damper means at the interior end of the damper slot, a feed conduit extending from the radially outward damper means surface to the damper channel and wherein the means for supplying a damping fluid acts to supply damping fluid through the feed conduit to the damper channel and from the damper channel through the damper slot.

3. The apparatus as set forth in claim 2 wherein the damping fluid is a lubricant, wherein the retainer defines a lubricant supply groove and feed conduits, at least one of said retainer feed conduits being in registration to supply lubricant to the damper means feed conduit and at least one of said retainer feed conduits acting to supply lubricant to a gap between the exterior surface of the damper means and the interior surface of the retainer.

4. The apparatus as set forth in claim 1 wherein the damper slot is located between the pivot means and the shaft and bearing, said pivot means being positioned closer to the interior end of the damper slot than the end of the damper slot terminating at the exterior surface of the damper means whereby upon the shaft and bearing applying a force to the damper means, the damper arm may rotate about the pivot means.

5. The apparatus as set forth in claim 4 wherein the pivot means is positioned relative to the damper slot to obtain displacement amplification of the exterior end of the damper arm to thereby obtain amplified damping.

6. The apparatus as set forth in claim 5 wherein the end of the damper arm adjacent the exterior surface of the damper means is displaced at least twice the distance the damper means is displaced upon the application of a force thereto by the shaft and bearing.

7. The apparatus as set forth in claim 4 wherein the means for supplying a damping fluid supplies a lubricating fluid and wherein that fluid is directed to the damper slot and to a gap between the radially outward surface of the damper means and the retainer such that displacement of the damper arm in either direction causes fluid displacement and damping.

8. A combination damper and spring in which a rotating shaft and bearing may be mounted which acts to damp vibration in said shaft and bearing which comprises:
   an annular damper body defining an interior bore having a generally cylindrical interior surface sized to receive the shaft and bearing and a generally cylindrical exterior surface;
   at least one damper arm formed from a portion of the damper body, said arm being defined by a slot extending from a cylindrical surface of the damper body into the interior of the damper body and the cylindrical surface of the damper body whereby said arm may be displaced distinctly from the remainer of the damper body; and
   said slot being sized to receive a damping fluid such that upon the application of a force to the combination damper and spring the combination is physically displaced and exerts a spring force against said displacement and the damper arm is displaced relative to the damper body, said displacement effecting displacement of fluid located within the slot to effect damping.

9. The apparatus as set forth in claim 8 and further comprising at least one damper pad projecting outwardly from the damper arm to engage a support structure, said damper pad serving as a pivot point for the damper arm when a force is applied to the damper body by the shaft and bearing.

10. The apparatus as set forth in claim 9 wherein the damper pad is positioned an angular distance of A from the interior end of the slot and an angular distance of B from the exterior end of the slot and wherein B is greater than A.

11. The apparatus as set forth in claim 10 wherein B is equal to or greater than two times A.

12. The apparatus as set forth in claim 9 wherein the damper pad is positioned to provide amplified damping by causing the exterior end of the damper arm to be displaced at least twice the distance the damper body is displaced upon the application of a radially outward force from the shaft and bearing.

13. The apparatus as set forth in claim 9 and further comprising a channel extending the width of the damper body at the interior end of the slot for supplying damping fluid to the slot.

14. The apparatus as set forth in claim 13 and further comprising a feed conduit extending radially through the damper body such that damping fluid may be supplied therefrom to the channel and to the bearing.

15. The apparatus as set forth in claim 14 and wherein the damper body and damper arm define a gap with the support structure and wherein damping fluid is supplied to the gap such that damping fluid is located on both sides of the damper arm.

* * * * *

UNITED STATES PATENT AND TRADEMARK OFFICE
CERTIFICATE OF CORRECTION

PATENT NO.   :   4,793,722

DATED        :   December 27, 1988

INVENTOR(S)  :   Richard C. Jensen

It is certified that error appears in the above-identified patent and that said Letters Patent is hereby corrected as shown below:

Column 1, line 19, "a" should read -- as --.

Column 6, claim 8, lines 45-46, "remainer" should read -- remainder --.

Signed and Sealed this

Twenty-fourth Day of October, 1989

*Attest:*

DONALD J. QUIGG

*Attesting Officer*          *Commissioner of Patents and Trademarks*